(12) United States Patent
Chung

(10) Patent No.: US 8,400,685 B2
(45) Date of Patent: Mar. 19, 2013

(54) IMAGE READING DEVICE AND IMAGE FORMING APPARATUS HAVING THE SAME, AND METHODS THEREOF

(75) Inventor: Jin Min Chung, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 682 days.

(21) Appl. No.: 12/540,614

(22) Filed: Aug. 13, 2009

(65) Prior Publication Data

US 2010/0110502 A1    May 6, 2010

(30) Foreign Application Priority Data

Nov. 3, 2008  (KR) .......................... 10-2008-108223

(51) Int. Cl.
*H04N 1/04* (2006.01)

(52) U.S. Cl. ........ 358/474; 358/498; 358/486; 399/367; 271/10.041; 271/10.11

(58) Field of Classification Search .................. 358/474, 358/498, 497, 496, 401, 505, 486; 399/21, 399/367; 271/10.05, 109, 10.09, 10.11, 10.04
See application file for complete search history.

(56) References Cited

U.S. PATENT DOCUMENTS

| | | | | |
|---|---|---|---|---|
| 5,017,963 A * | 5/1991 | Tuhro | ........................... | 399/190 |
| 5,101,284 A * | 3/1992 | Tanabe | ......................... | 358/461 |
| 5,506,658 A * | 4/1996 | Takemura et al. | ............. | 399/21 |
| 6,166,394 A * | 12/2000 | Rubscha | ................... | 250/559.42 |
| 6,167,232 A * | 12/2000 | Jimenez et al. | ............... | 399/367 |
| 6,567,188 B1 * | 5/2003 | Thompson et al. | ........... | 358/461 |
| 6,641,130 B2 * | 11/2003 | Lee et al. | ................... | 271/10.04 |
| 6,786,480 B2 * | 9/2004 | Lee et al. | ................... | 271/10.12 |
| 6,880,822 B2 * | 4/2005 | Fukushima et al. | .......... | 271/157 |
| 7,261,289 B2 * | 8/2007 | Lee et al. | ................... | 271/10.04 |
| 7,355,761 B2 * | 4/2008 | Yang | ............................. | 358/474 |
| 7,405,850 B2 * | 7/2008 | Chang | .......................... | 358/496 |
| 7,433,097 B2 * | 10/2008 | Spears | ......................... | 358/504 |
| 7,545,544 B2 * | 6/2009 | Tanaka et al. | ................. | 358/496 |
| 7,633,653 B2 * | 12/2009 | Nishizawa et al. | ........... | 358/461 |
| 7,808,680 B2 * | 10/2010 | Lee | ............................... | 358/461 |
| 7,974,567 B2 * | 7/2011 | Park | ............................. | 399/374 |

FOREIGN PATENT DOCUMENTS

KR        20050040435        5/2005

* cited by examiner

*Primary Examiner* — Negussie Worku
(74) *Attorney, Agent, or Firm* — Stanzione & Kim, LLP

(57) ABSTRACT

An image reading device and an image forming apparatus having the same. The image reading device includes an scanning glass, a white bar arranged opposite the scanning glass, and a drive roller provided at the white bar, the drive roller being rotated upon receiving power to allow a document to pass between the scanning glass and the white bar.

48 Claims, 4 Drawing Sheets

IMAGE READING DEVICE AND IMAGE FORMING APPARATUS HAVING THE SAME, AND METHODS THEREOF

CROSS-REFERENCE TO RELATED APPLICATIONS

This application claims the benefit of priority under 35 U.S.C. §119(a) from Korean Patent Application No. 2008-0108223, filed on Nov. 3, 2008 in the Korean Intellectual Property Office, the disclosure of which is incorporated herein by reference in its entirety.

BACKGROUND

1. Field of the Invention

The present general inventive concept relates to an image forming apparatus, and more particularly, to an image reading device having an automatic document feed unit and an image forming apparatus having the same.

2. Description of the Related Art

Image reading devices are provided in a variety of image forming apparatuses, such as printers, copiers, scanners, or devices combining functions thereof, and serve to read image information recorded in a document.

Some image reading devices typically include an automatic document feed unit to automatically feed documents to an image reading unit to enable successive scanning operations.

These image reading devices having the automatic document feed unit include a scanning frame to define an external appearance of the image reading device, and a cover pivotally installed to the scanning frame so as to open or close an upper surface of the scanning frame. A scanning unit is installed within the scanning frame and is used to read image information included in a document. The automatic document feed unit is provided at the cover.

Provided on the upper surface of the scanning frame are a manual scanning glass, on which a user places documents sheet by sheet to scan the documents, and a scanning glass to scan documents delivered by the automatic document feed unit. A white bar is installed opposite an upper surface of the scanning glass and serves to position the document in close contact with the scanning glass.

The scanning unit is disposed below the manual and scanning glasses, and serves to read image information recorded in the document that has been placed on the manual scanning glass or the document that has been delivered by the automatic document feed unit.

The above-described image reading device using the white bar, however, has a problem in that the document comes into frictional contact with both the white bar and the scanning glass while passing therebetween, resulting in an unexpected temporary change in a document delivery speed depending on a surface condition of the document. Such a change in the document delivery speed may prevent the scanning unit from correctly scanning the image information of the document.

SUMMARY

The present general inventive concept provides an image reading device that allows a document to pass between a white bar and an scanning glass at a constant speed, and an image forming apparatus having the same.

Additional features and utilities of the general inventive concept will be set forth in part in the description which follows and, in part, will be obvious from the description, or may be learned by practice of the general inventive concept.

Embodiments of the present general inventive concept can be achieved by providing an image reading device including a scanning glass, a white bar arranged opposite the scanning glass, and a drive roller provided at the white bar to rotate upon receiving power to allow a document to pass between the scanning glass and the white bar.

The drive roller may be spaced apart from the scanning glass.

A gap between the drive roller and the scanning glass may be between about 0.1 mm to about 1.0 mm.

The white bar may include a roller hole through which the drive roller partially penetrates.

The white bar may include a scan portion on which the document is scanned, and a guide portion extending from the scan portion and having the roller hole.

The image reading device may further include a guide film made of an elastically deformable material to guide the document to the scanning glass, and a tip end of the guide film that may be elastically supported by the scanning glass.

The image reading device may further include first scan rollers arranged along a path upstream of the scanning glass and the white bar to deliver the document to the scanning glass, and the drive roller may be arranged along the path between a scan point where scanning is performed and the first scan rollers.

The image reading device may further include a collision point where a leading end of the document having passed through the first scan rollers collides with the scanning glass, and the collision point may be spaced apart from the scan point by about 5 mm to about 15 mm.

The image reading device may further include second scan rollers arranged along a path downstream of the scanning glass and the white bar to transfer the document from the path.

The path may guide the document to nip portions of the second scan rollers.

The image reading device may further include a drive motor to generate rotating force, and a scan roller to be rotated upon receiving the rotating force from the drive motor, and the drive roller may be operated by the rotation of the scan roller.

Embodiments of the present general inventive concept can be achieved by providing an image reading device including a scan path on which a document is scanned, a scanning glass and a white bar arranged opposite each other along the scan path, a first scan roller and a second scan roller arranged along the scan path upstream and downstream, respectively, of the scanning glass and the white bar, and a drive roller arranged along the scan path between the first scan roller and the second scan roller to deliver the document to the scanning roller and the white bar.

Embodiments of the present general inventive concept can be achieved by providing an image reading device including a scanning glass, a white bar arranged opposite the scanning glass, a drive motor to generate rotating force, and a drive roller to rotate upon receiving power from the drive motor to allow a document to pass between the scanning glass and the white bar, wherein the drive roller may be installed to the white bar so as to penetrate through the white bar while being spaced apart from the scanning glass.

Embodiments of the present general inventive concept can be achieved by providing an image forming apparatus including an image reading device to read image information from a document and an image printing device to print an image on a printing medium, the image reading device including a scanning glass, a white bar arranged opposite the scanning glass, and a drive roller provided at the white bar to rotate upon receiving power to allow the document to pass between the scanning glass and the white bar.

Embodiments of the present general inventive concept can be achieved by providing an image forming apparatus including an image reading device to read image information from a document and an image printing device to print an image on a printing medium, the image reading device including a scan path on which the document is scanned, a scanning glass and a white bar arranged opposite each other along the scan path, a first scan roller and a second scan roller arranged along the scan path upstream and downstream, respectively, of the scanning glass and the white bar, and a drive roller arranged along the scan path between the first scan roller and the second scan roller to deliver the document to the scanning roller and the white bar.

Embodiments of the present general inventive concept can also be achieved by providing an image reading device including, a scanning glass, a white bar disposed to form a path of a medium with the scanning glass and including a first portion to face the scanning glass to scan a medium at a scan point of the medium path, a second portion extended from the first portion, and a hole formed on the second portion, and a drive roller installed to protrude from the second portion through the hole toward the path to feed the medium.

The image reading device may further include a frame having the scanning glass, the white bar, and the drive roller, wherein the frame includes a feed path including the medium path, an outlet extending from the medium path, a first path to connect the medium from the medium path to the feed path, and a second path to connect the medium from the medium path to the outlet path.

Embodiments of the present general inventive concept can also be achieved by providing a method of scanning a document in an image scanning apparatus, the method including feeding a document at a predetermined speed to a scanning point on a scanning glass by rotating a driving roller disposed at a white bar arranged opposite the scanning glass, and scanning the document as the document passes the scanning point.

Embodiments of the present general inventive concept can also be achieved by providing a method of scanning a document in an image scanning apparatus, the method including feeding a document towards a scanning point on a scanning glass, applying a delivery force to the document with a driving roller disposed at a white bar arranged opposite the scanning glass to feed the paper at a predetermined speed to the scanning point, and scanning the document as the document passes the scanning point.

Embodiments of the present general inventive concept can also be achieved by providing a method of an image forming apparatus, the method including feeding a document at a predetermined speed to a scanning point on a scanning glass by rotating a driving roller disposed at a white bar arranged opposite the scanning glass, scanning image data of the document as the document passes the scanning point, and printing the image data on a printing medium.

Embodiments of the present general inventive concept can also be achieved by providing a method of an image forming apparatus, including feeding a document towards a scanning point on a scanning glass, applying a delivery force to the document with a driving roller disposed at a white bar arranged opposite the scanning glass to feed the paper at a predetermined speed to the scanning point, scanning image data of the document as the document passes the scanning point, and printing the image data on a printing medium.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings, of which.

DETAILED DESCRIPTION OF THE EMBODIMENTS

Figure 1:
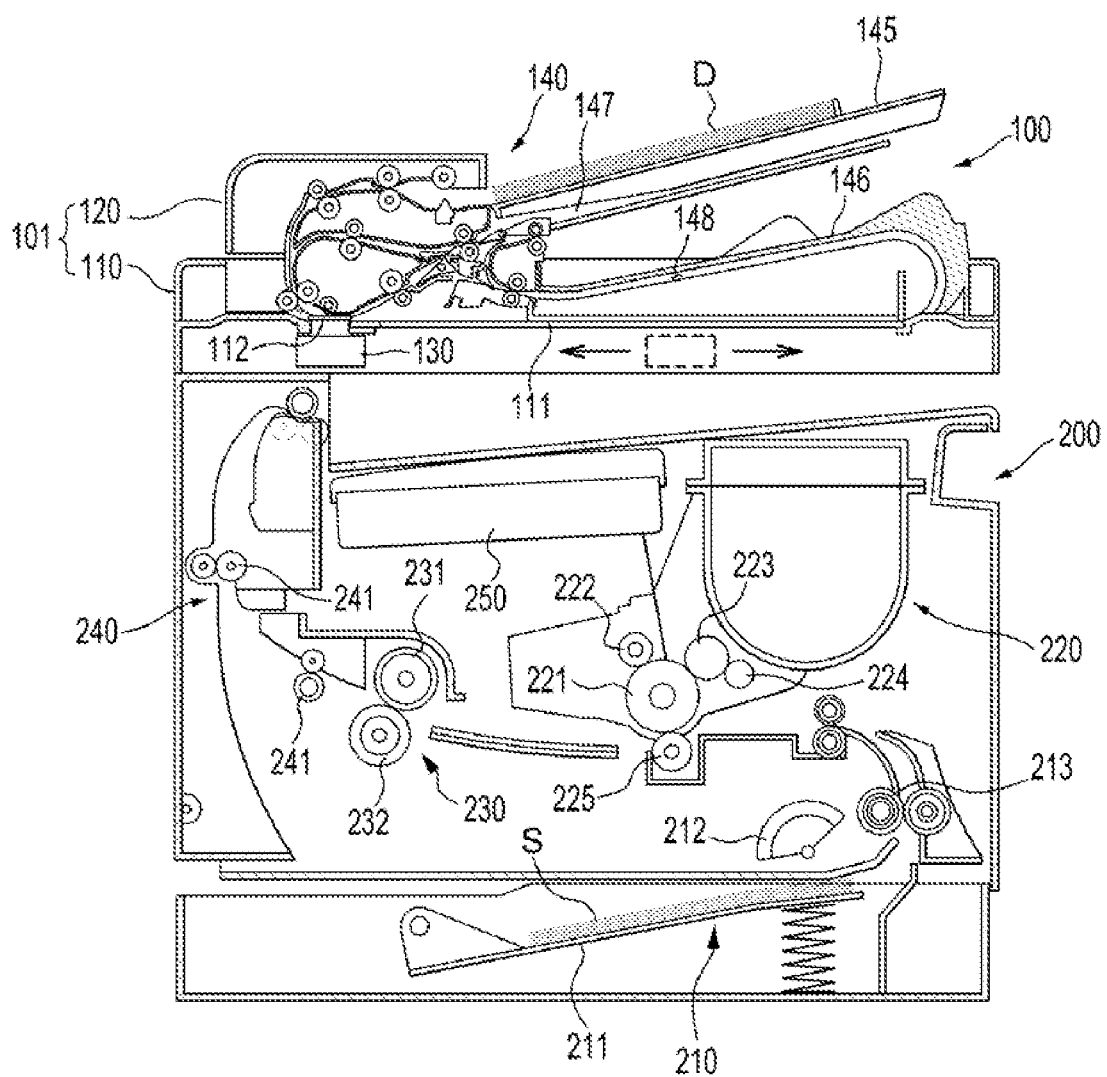
FIG. 1 is a sectional view illustrating a configuration of an image forming apparatus according to an exemplary embodiment of the present general inventive concept.

Reference will now be made in detail to the exemplary embodiments of the present general inventive concept, examples of which are illustrated in the accompanying drawings, wherein like reference numerals refer to the like elements throughout. The exemplary embodiments are described below to explain the present general inventive concept by referring to the figures.

As illustrated in FIG. 1, an image forming apparatus includes an image reading device 100 to read image information from a document, and an image printing device 200 to print an image on a printing medium.

The image printing device 200 prints an image upon receiving an image signal input from the image reading device 100, or an image signal input from an exterior device, such as a PC, mobile device, PDA, and the like. The image printing device 200 may include a printing medium feed unit 210 to feed sheets of printing media S, a developing unit 220 to develop an image on a printing medium S, a fixing unit 230 to fix the image onto the printing medium S by applying heat and pressure to the printing medium S, a printing medium discharge unit 240 to discharge the printing medium S, on which the image is printed, outside of the image printing device, and an exposure unit 250 to form an electrostatic latent image on a photoconductor 221 of the developing unit 220.

The printing medium feed unit 210 may include a tray 211 in which the printing medium S is loaded, a pickup roller 212 to pick up the printing medium S loaded in the tray 211 one printing medium S at a time (i.e., sheet by sheet), and a delivery roller 213 to deliver the picked-up printing medium S to the developing unit 220.

The developing unit 220 may include a photoconductor 221, a surface of which is formed with an electrostatic latent image via the exposure unit 250, a charge roller 222 to electrically charge the photoconductor 221, a developing roller 223 to develop the electrostatic latent image formed on the photoconductor 221 into a visible toner image using toner, a toner feed roller 224 to feed the toner to the developing roller 223, and a transfer roller 225 to press the printing medium S toward the photoconductor 221 so as to transfer the toner image on the photoconductor 221 to the printing medium S.

The fixing unit 230 may include a heating roller 231 containing a heat source to apply heat to the toner image transferred onto the printing medium S, and a press roller 232 installed opposite the heating roller 231 to maintain a constant fixing pressure in a gap with the heating roller 231.

The printing medium discharge unit 240 may include a series of discharge rollers 241 sequentially arranged to discharge the printing medium S, having passed through the fixing unit 230, outside of the image printing device.

Figure 2:
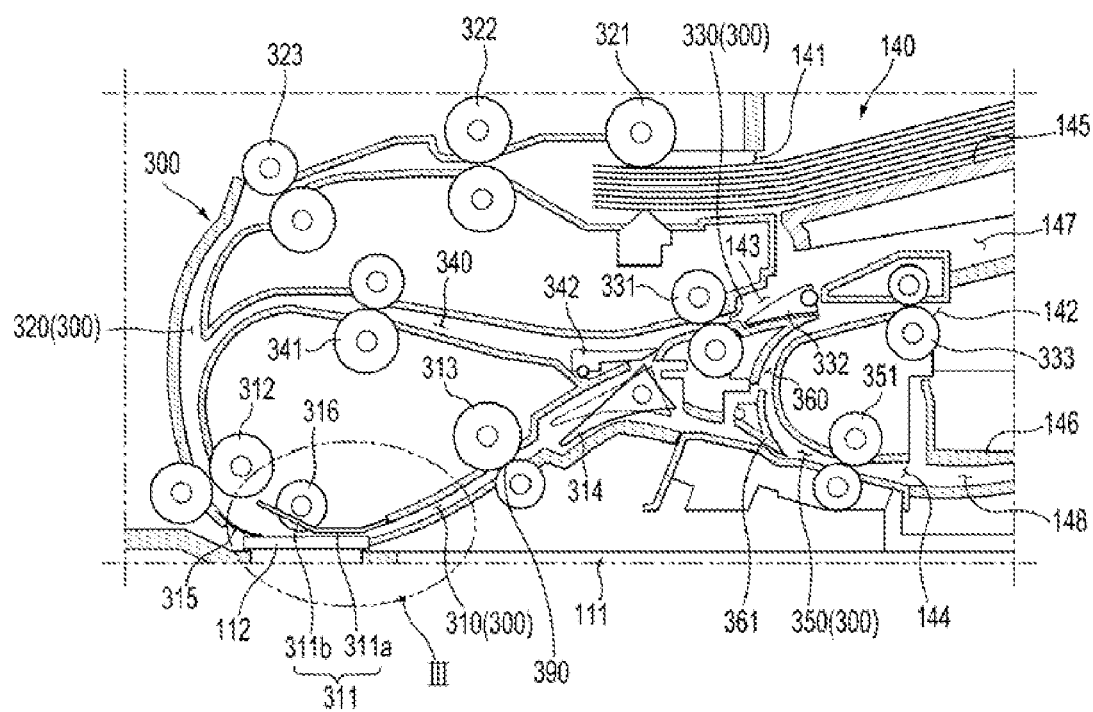
FIG. 2 is a sectional view illustrating an automatic document pickup unit included in an image forming apparatus according to an exemplary embodiment of the present general inventive concept.

As illustrated in FIGS. 1 and 2, the image reading device 100 may include an exterior 101, including a scanning frame 110 defining an external appearance of the image reading device 100 and a cover 120 pivotally and/or rotatably installed to the scanning frame 110 so as to open or close an upper surface of the scanning frame 110.

A scanning unit 130 may be installed within the scanning frame 110 to read information recorded in a document. Additionally, an automatic document feed unit 140 may be provided at the cover 120 to automatically feed documents to enable successive scanning operations. A document may include at least one sheet, and each sheet of a document corresponds to a printing medium S. Each sheet, and accordingly each document, has a first surface and a second surface, and may contain image information on either the first surface, the second surface, or both the first and second surfaces. A user may determine whether to scan the first surface of a sheet, or both the first and second surfaces of a sheet.

Provided on the upper surface of the scanning frame 110 are a manual scanning glass 111, on which a user places documents sheet by sheet to scan the documents, and an scanning glass 112 to scan documents delivered by the automatic document feed unit 140. The scanning unit 130 is disposed below the manual and scanning glasses 111 and 112, and serves to read image information recorded on a document that has been placed on the manual scanning glass 111, or a document that has been delivered by the automatic document feed unit 140.

The scanning unit 130 is adapted to irradiate light to a document and to detect the light reflected from the document. Accordingly, the scanning unit 130 is able to read information from the document by converting the detected light into electric signals. The scanning unit 130 may be selected from a Contact Image Sensor (CIS), Charge Coupled Device (CCD), and the like.

The automatic document feed unit 140 may include a document inlet 141 through which a document to be scanned is introduced into the image reading device 100, a document outlet 142 through which scanned document is discharged from the image reading device 100, a first provisional discharge port 143 through which a double-sided document having a first surface scanned by the scanning unit 130 are provisionally discharged, a second provisional discharge port 144 through which a double-sided document having the first and second surfaces scanned by the scanning unit 130 are provisionally discharged, a document delivery path 300 defined in the interior of the cover 120 for document delivery, and a plurality of rollers arranged on the document delivery path 300 for document delivery.

The document inlet 141, first provisional discharge port 143, document outlet 142, and second provisional discharge port 144 may be arranged sequentially from the top to the bottom of the cover 120. A document loader 145 is provided near the document inlet 141, on which the document to be delivered by the automatic document feed unit 140 are loaded. A document unloader 146 is provided near the document outlet 142, on which the completely scanned document, having been discharged through the document outlet 142, is loaded. A first provisional receptacle 147 is provided below the document loader 145 to provisionally receive at least one document that has had the first surface thereof scanned by the scanning unit 130 and have been discharged from the first provisional discharge port 143. Additionally, a second provisional receptacle 148 is provided below the document unloader 146 to provisionally receive at least one double-sided document that has had the first and second surfaces thereof scanned by the scanning unit 130 and have been discharged from the second provisional discharge port 144. A document may be provisionally discharged through the first or second provisional discharge ports 143 or 144 to be received at the corresponding first or second provisional receptacles 147 or 148 before being fed back through corresponding first or second provisional discharge ports 143 or 144.

The document delivery path 300 may include a scan path 310, a feed path 320, a first discharge path 330, a reversion path 340, a second discharge path 350, and a re-reversion path 360. The feed path 320 includes a first end connected to the document inlet 141 and a second end connected to the scan path 310. The first discharge path 330 includes a first end connected to the scan path 310 and a second end connected to one of the first provisional discharge port 143 and the document outlet 142. The reversion path 340 includes a first end connected to a junction between the scan path 310 and the first discharge path 330 and a second end connected to the feed path 320. The second discharge path 350 includes a first end connected to the scan path 310, a second end connected to the second provisional discharge port 144 and a third end connected to a first end of the re-reversion path. The re-reversion path 360 includes the first end connected to the second discharge path 350 and a second end connected to the document outlet 142.

The following describes the path of a document through the document delivery path 300 according to an exemplary embodiment of the present general inventive concept. A document is fed from document inlet 141 to a first end of the feed path 320. The document is fed from the second end of the feed path 320 to the scan path 310, where the scanning unit 130 performs a scanning operation to read information on a first surface of the document. The document is fed from the scan path 310 to the first end of the first discharge path 330. In the present exemplary embodiment, if only the first surface of the document is to be scanned, the document is fed from the second end of the first discharge path 330 to the document outlet 142. In the present exemplary embodiment, if a second surface of the document is to be scanned, the document is fed from the second end of the first discharge path 330 to the first provisional discharge port 143 and the first provisional receptacle 147. The document is fed from the first provisional receptacle 147 and the first provisional discharge port 143 to the first end of the reversion path 340. The document is fed from the second end of the reversion path 340 to a first end of the feed path 320. The document is fed from the second end of the feed path 320 to the scan path 310, where the scanning unit 130 performs a scanning operation to read information on the second surface of the document. The document is fed from the scan path 310 to the first end of the second discharge path 350. The document is fed from the second end of the second discharge path 350 to the second provisional discharge port 144 and the second provisional receptacle 148. The document is fed from the second provisional receptacle 148 and the second provisional discharge port 144 to the third end of the second discharge path 350, and the first end of the re-reversion path 360. The document is fed from the second end of the re-reversion path 360 to the document outlet 142, and discharged to the document unloader 146.

The feed path 320 is provided with a document pickup roller 321 to pick up the document loaded on the document loader 145, a feed roller 322 to deliver the document to the feed path 320, and a register roller 323 for document alignment.

The scan path 310 includes the scanning glass 112 and the scanning unit 130 to read image information recorded on the document passing through the scan path 310. Additionally, the scan path 310 is provided with a white bar 311, first scan rollers 312, second scan rollers 313, and a first converting guide 314. The white bar 311 is disposed above the scanning glass 112 and allows the document to come into close contact with the scanning glass 112. The first and second scan rollers 312 and 313 serve to cause the document to be delivered along the scan path 310 between the scanning glass 112 and the white bar 311. The first converting guide 314 selectively delivers the document to any one of the first discharge path 330 and the second discharge path 350. The first converting guide 314 moves between a first position to deliver the document to the first discharge path 330 and a second position to deliver the document to the second discharge path 350 based on whether the second surface of the document has been read by the scanning unit 130.

Figure 3:
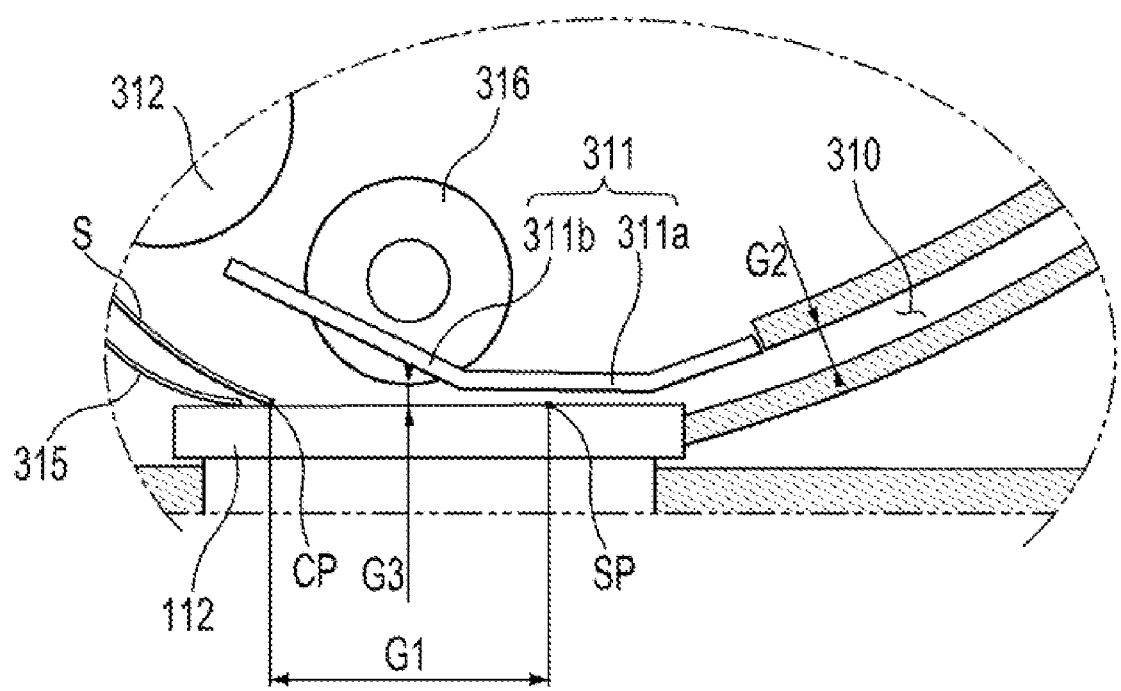
FIG. 3 is an enlarged view of the portion III in FIG. 2.

In the present exemplary embodiment, the first scan roller 312 includes a pair of first scan rollers 312 located upstream of the white bar 311, and the second scan roller 313 includes a pair of second scan rollers 313 located downstream of the white bar 311, on the basis of a document delivery direction. The scan roller arrangement assures stable document delivery and provides a scan point SP, as illustrated in FIG. 3, at which scanning of the document between the scanning glass 112 and the white bar 311 is performed, and a collision point CP, as illustrated in FIG. 3, at which a leading end of the document having passed through the first scan rollers 312 collides with the scanning glass 112. In the present exemplary embodiment, a gap G1 between the collision point CP and the scan point SP may have a length from 5 mm to 15 mm. When the gap G1 between the collision point CP and the scan point SP is too small, there is a risk of incorrect scanning as the document, which is temporarily bent upon collision with the scanning glass 112, passes through the scan point SP.

A guide film 315 is provided along the scan path 310 to allow the document, having passed through the first scan rollers 312, to more stably come into contact with the scanning glass 112. The guide film 315 may be made of an elastically deformable material and is elastically supported at a tip end thereof by the scanning glass 112. Elastically supporting the tip end of the guide film 315 with the scanning glass 112 causes the guide film 315 to be elastically deformed and bent into an arc, thereby enabling a more stable change in a delivery direction of the document delivered along the guide film 315 and consequently, reducing an impact of the collision between the leading end of the document and the scanning glass 112.

The first discharge path 330 is provided with a second discharge roller 331 to deliver the document along the first discharge path 330, a second converting guide 332 to selectively deliver the document to one of the first provisional discharge port 143 and the document outlet 142, and a fourth discharge roller 333 to deliver the document from first discharge path 330, through the document outlet 142, and into the document unloader 146. The converting guide 332 moves between a first position to deliver the document to the first provisional discharge port 143 and a second position to deliver the document to the document outlet 142. The second discharge roller 331 is installed in a forwardly or reversely rotatable manner and thus, delivers the document to one of the first provisional discharge port 143 and the document outlet 142 via forward rotation thereof, and guides the document received in the first provisional receptacle 147 to the reversion path 340 via reverse rotation thereof.

The second discharge path 350 is provided with a third discharge roller 351 to deliver the document along the second discharge path 350. The third discharge roller 351 is installed in a forwardly or reversely rotatable manner and thus, delivers the document to the second provisional discharge port 144 via forward rotation thereof, and guides the document received in the second provisional receptacle 148 to the document outlet 142 through the re-reversion path 360 via reverse rotation thereof.

The reversion path 340 is provided with a reversion roller 341 to deliver the document from the reversion path 340 to the feed path 320, and a third converting guide 342 at the first end of the reversion path 340 connected to a junction between the scan path 310 and the first discharge path 330. The third converting guide 342 serves to guide the document received in the first provisional receptacle 147 to the reversion path 340, and to allow passage of the document delivered from the scan path 310 to the first discharge path 330.

The fourth converting guide 361 is provided at a junction between the second discharge path 350 and the re-reversion path 360. The fourth converting guide 361 serves to guide the document delivered from the second provisional receptacle 148 to the re-reversion path 360, and to allow passage of the document delivered from the scan path 310 to the second provisional receptacle 148 through the second discharge path 350 and the third discharge roller 351.

With the above-described configuration, upon one-sided scanning of the document, the document sequentially passes through the feed path 320, the scan path 310 and the first discharge path 330, and then is discharged to the document unloader 146 through the document outlet 142.

Also, upon double-sided scanning of the document, the document sequentially passes through the feed path 320, the scan path 310 and the first discharge path 330 to thereby be delivered to and temporarily stored at the first provisional receptacle 147. Using the reverse rotation of the second discharge roller 331, the document sequentially passes through the reversion path 340, the feed path 320, the scan path 310 and the second discharge path 350 to thereby be delivered to and temporarily received at the second provisional receptacle 148. Subsequently, using the reverse rotation of the third discharge roller 351, the document received in the second provisional receptacle 148 is delivered to the document outlet 142 through the re-reversion path 360, thereby being discharged to the document unloader 146 through the document outlet 142.

Referring to FIG. 3, the image reading device 100 is further provided with a drive roller 316, to allow the document to pass between the white bar 311 and the scanning glass 112 at a constant speed. The drive roller 316 is disposed along the scan path 310 between the first scan rollers 312 and the scan point SP. In the present exemplary embodiment, the drive roller 316 is installed to the white bar 311 and is rotated upon receiving power to assist delivery and passage of the document between the white bar 311 and the scanning glass 112.

Figure 4:
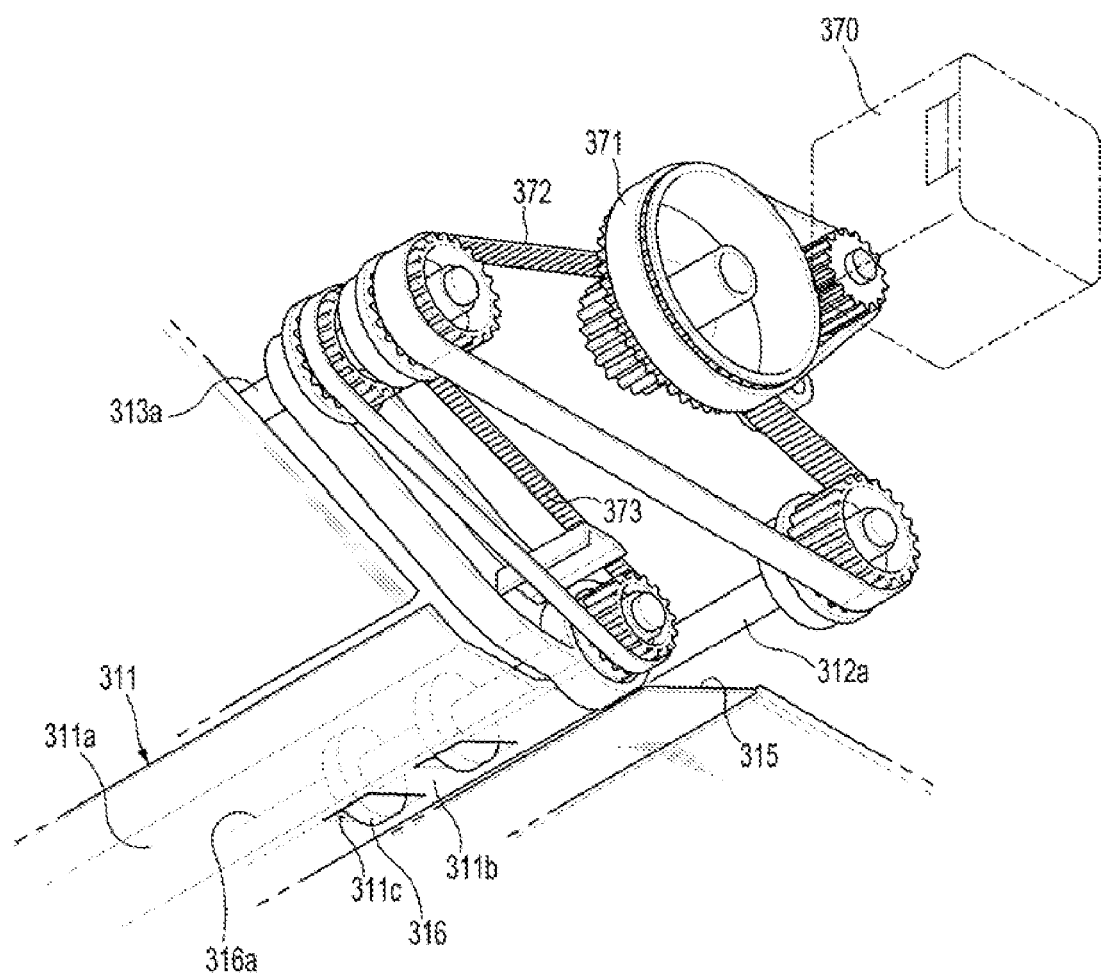
FIG. 4 is a perspective view illustrating power transmission with respect to drive rollers in an image forming apparatus according to an exemplary embodiment of the present general inventive concept.

In the present exemplary embodiment, the white bar 311 may include a scan portion 311a arranged opposite the scanning glass 112 on which scanning of the document is performed, and a guide portion 311b obliquely extending from opposite sides of the scan portion 311a for document guidance. The guide portion 311b is perforated with a roller hole 311c, as illustrated in FIG. 4, through which the drive roller 316 partially penetrates and protrudes. The drive roller 316 protrudes into the scan path 310 through the roller hole 311c, to apply a delivery force to the document introduced between the scan portion 311a and the scanning glass 112 along the scan path 310.

When the drive roller 316 is installed to the white bar 311 as described in the present exemplary embodiment, the drive roller 316 applies a delivery force to the document immediately before the document passes between the scan portion 311a of the white bar 311 and the scanning glass 112, to pass the document between the scan portion 311a of the white bar 311 and the scanning glass 112 at a constant speed equivalent to a rotating speed of the drive roller 316, thus resulting in more accurate scanning of the document.

Moreover, with the application of a delivery force using the drive roller 316, if a width G2 of the scan path 310 downstream of the white bar 311 and the scanning glass 112 is between 1 mm and 2.5 mm, there is no unwanted reduction in the delivery speed of the document due to friction between the document and the scan path 310. Accordingly, even when the width G2 of the scan path 310 downstream of the white bar 311 and the scanning glass 112 is between 1 mm and 2.5 mm in order to reduce movement of the document in a direction corresponding to the width G2 and to consequently achieve more stable delivery of the document, the delivery speed of the document can be constantly maintained by the drive roller 316. Although the scan path 310 is generally about 2.5 mm wide in order to smoothly deliver the document, it has been found that using the drive roller 316 installed to the white bar 311 as described in the present exemplary embodiment can reduce the width G2 of the scan path 310 to about 1 mm without deteriorating the smooth delivery of the document to the second scan rollers 313.

A portion of the scan path 310 downstream of the white bar 311 and the scanning glass 112 extends toward nip portions 390 of the second scan rollers 313. With this configuration, a leading end of the document delivered along the scan path 310 is correctly guided to the nip portions 390 of the second scan rollers 313, thereby flattening a portion of the document between the second scan rollers 313. This prevents wave-shaped deformation of the document that may be caused due to a delivery speed difference between leading and trailing ends of the document when the leading end of the document collides with an outer periphery of the second scan rollers 313.

The drive roller 316 may be spaced apart at an outer periphery thereof from the scanning glass 112 by a predetermined gap G3. If the drive roller 316 comes into frictional contact with the scanning glass 112, rotation of the drive roller 316 at an appropriate speed requires significant power to overcome a frictional force between the drive roller 316 and the scanning glass 112. Including the gap G3 between the drive roller 316 and the scanning glass 112 reduces frictional contact between the drive roller 316 and the scanning glass 112. Accordingly, when the drive roller 316 is spaced apart from the scanning glass 112 so as to come into frictional contact with only the document, providing the drive roller 316 with only power required to deliver the document to the second scan rollers 313 allows the drive roller 316 to be rotated upon receiving power transmitted through a variety of neighboring shafts without a motor. In the present exemplary embodiment, the gap G3 between the outer periphery of the drive roller 316 and the scanning glass 112 is maintained in a range from 0.1 mm to 1.0 mm.

Referring to FIG. 4, the image reading device 100 according to an exemplary embodiment of the present general inventive concept may include a drive motor 370 to operate the various rollers arranged in the image reading device 100. In the present exemplary embodiment, the drive motor 370 is connected to a shaft 312a of the first scan rollers 312 and a shaft 313a of the second scan rollers 313 via a plurality of belts 371 and 372, to rotate the first and second scan rollers 312 and 313, respectively. A shaft 316a of the drive roller 316 is connected to the shaft 313a of the second scan rollers 313 via a drive belt 373, to operate the drive roller 316 by the rotation of the second scan rollers 313. In the present exemplary embodiment, the drive roller 316 is rotated upon receiving power transferred from the drive motor 370 to the shaft 313a of the second rollers 313. Accordingly, the drive roller 316 is rotated by indirectly receiving rotating power from the drive motor 370 via the shaft 313a of the second scan rollers 313.

As is apparent from the above description, the above-described exemplary embodiment provides an image reading device in which a white bar is provided with a drive roller, and an image forming apparatus having the same. As the drive roller provided at the white bar applies a delivery force to a document immediately before the document passes between the white bar and an scanning glass, the document can pass between the white bar and the scanning glass at a constant speed, enabling more accurate scanning thereof.

Although several exemplary embodiments of the present general inventive concept have been illustrated and described, it would be appreciated by those skilled in the art that changes may be made in these exemplary embodiments without departing from the principles and spirit of the general inventive concept, the scope of which is defined in the claims and their equivalents.

What is claimed is:

1. An image reading device comprising:
    a scanning glass;
    a white bar arranged opposite the scanning glass; and
    a drive roller provided at an upstream portion of the white bar to rotate upon receiving power to feed a document to pass between the scanning glass and the white bar.

2. The image reading device according to claim 1, wherein the drive roller is spaced apart from the scanning glass.

3. The image reading device according to claim 2, wherein a gap between the drive roller and the scanning glass is between about 0.1 mm to about 1.0 mm.

4. The image reading device according to claim 1, wherein the white bar includes a roller hole through which the drive roller partially penetrates.

5. The image reading device according to claim 4, wherein the white bar includes a scan portion on which the document is scanned, and a guide portion extending from the scan portion and having the roller hole.

6. The image reading device according to claim 5, further comprising:
    a guide film made of an elastically deformable material to guide the document to the scanning glass; and
    a tip end of the guide film that is elastically supported by the scanning glass.

7. The image reading device according to claim 1, further comprising:
    first scan rollers arranged along a path upstream of the scanning glass and the white bar to deliver the document to the scanning glass,
    wherein the drive roller is arranged along the path between a scan point where scanning is performed and the first scan rollers.

8. The image reading device according to claim 7, further comprising:

a collision point where a leading end of the document having passed through the first scan rollers collides with the scanning glass,
wherein the collision point is spaced apart from the scan point by about 5 mm to about 15 mm.

9. The image reading device according to claim 1, further comprising:
second scan rollers arranged along a path downstream of the scanning glass and the white bar to transfer the document from the path.

10. The image reading device according to claim 9, wherein the path guides the document to nip portions of the second scan rollers.

11. The image reading device according to claim 1, further comprising:
a drive motor to generate rotating force; and
a scan roller to rotate upon receiving the rotating force from the drive motor,
wherein the drive roller is operated by the rotation of the scan roller.

12. An image reading device comprising:
a scan path on which a document is scanned;
a scanning glass and a white bar arranged opposite each other along the scan path;
a first scan roller and a second scan roller arranged along the scan path upstream and downstream, respectively, of the scanning glass and the white bar; and
a drive roller arranged along the scan path between the first scan roller and the second scan roller to deliver the document to the scanning glass and the white bar.

13. The image reading device according to claim 12, wherein the drive roller is spaced apart from the scanning glass.

14. The image reading device according to claim 12, wherein the white bar includes a roller hole through which the drive roller partially penetrates.

15. The image reading device according to claim 14, wherein the white bar includes a scan portion on which the document is scanned, and a guide portion extending from the scan portion and having the roller hole.

16. The image reading device according to claim 12, further comprising:
a guide film made of an elastically deformable material and arranged along the scan path, the guide film to guide the document to the scanning glass; and
a tip end of the guide film that is elastically supported by the scanning glass.

17. The image reading device according to claim 12, wherein the second scan roller includes nip portions, and wherein the scan path downstream of the scanning glass and the white bar guides the document to the nip portions.

18. The image reading device according to claim 12, further comprising:
a drive motor to generate rotating force so as to rotate the second scan roller,
wherein the drive roller is operated by the rotation of the second scan roller.

19. The image reading device according to claim 12, wherein a scan path to deliver the document provides the document to a scan surface of the scanning glass at an angle.

20. The image reading device according to claim 12, wherein the driver roller applies a delivery force to the document before the document passes between a scan portion of the white bar and the scanning glass.

21. The image reading device according to claim 12, wherein a width of the scan path downstream of the white bar and the scanning glass is between 1 mm and 2.5 mm.

22. An image reading device comprising:
a scanning glass;
a white bar arranged opposite the scanning glass;
a drive motor to generate rotating force; and
a drive roller to rotate upon receiving power from the drive motor to pass a document between the scanning glass and the white bar, the drive roller being installed to the white bar so as to penetrate through the white bar to be spaced apart from the scanning glass to avoid frictional contact with the scanning glass.

23. The image reading device according to claim 22, wherein the white bar includes a scan portion on which the document is scanned, and a guide portion extending from the scan portion and having a roller hole through which the drive roller penetrates.

24. The image reading device according to claim 22, further comprising:
a guide film made of an elastically deformable material to guide the document to the scanning glass; and
a tip end of the guide film that is elastically supported by the scanning glass.

25. The image reading device according to claim 22, further comprising:
first scan rollers arranged along a path upstream of the scanning glass and the white bar to deliver the document to the scanning glass,
wherein the drive roller is arranged along the path between a scan point where scanning is performed and the first scan rollers.

26. The image reading device according to claim 22, further comprising:
second scan rollers arranged along a path downstream of the scanning glass and the white bar to transfer the document from the path.

27. An image forming apparatus, comprising:
an image reading device to read image information from a document including,
a scanning glass,
a white bar arranged opposite the scanning glass, and
a drive roller provided at an upstream portion of the white bar to rotate upon receiving power to feed the document to pass between the scanning glass and the white bar.

28. The image forming apparatus according to claim 27, wherein the drive roller is spaced apart from the scanning glass.

29. The image forming apparatus according to claim 27, wherein the white bar includes a roller hole through which the drive roller partially penetrates towards the scanning glass.

30. The image forming apparatus according to claim 29, wherein the white bar includes a scan portion on which the document is scanned, and a guide portion extending from the scan portion and having the roller hole.

31. The image forming apparatus according to claim 27, further comprising:
a guide film made of an elastically deformable material to guide the document to the scanning glass;
a tip end of the guide film that is elastically supported by the scanning glass.

32. The image forming apparatus according to claim 27, further comprising:
first scan rollers arranged along a path upstream of the scanning glass and the white bar to deliver the document to the scanning glass,
wherein the drive roller is arranged along the path between a scan point where scanning is performed and the first scan rollers.

33. The image forming apparatus according to claim 27, further comprising:
a drive motor to generate rotating force; and
a scan roller to rotate upon receiving the rotating force from the drive motor,
wherein the drive roller is operated by the rotation of the scan roller.

34. The image forming apparatus according to claim 27, further comprising:
second scan rollers arranged along a path downstream of the scanning glass and the white bar to transfer the document from the path.

35. The image forming apparatus according to claim 34, wherein the second scan rollers include nip portions, and wherein the path downstream of the scanning glass and the white bar guides the document to the nip portions.

36. An image forming apparatus, comprising:
an image reading device to read image information from a document including:
a scan path along which the document is scanned,
a scanning glass and a white bar arranged opposite each other along the scan path,
a first scan roller and a second scan roller arranged along the scan path upstream and downstream, respectively, of the scanning glass and the white bar, and
a drive roller arranged along the scan path between the first scan roller and the second scan roller to deliver the document to the scanning glass and the white bar.

37. The image forming apparatus according to claim 36, wherein the drive roller is spaced apart from the scanning glass.

38. The image forming apparatus according to claim 36, wherein the white bar includes a roller hole through which the drive roller partially penetrates towards the scanning glass.

39. The image forming apparatus according to claim 38, wherein the white bar includes a scan portion on which the document is scanned, and a guide portion extending from the scan portion and having the roller hole.

40. The image forming apparatus according to claim 36, further comprising:
a guide film made of an elastically deformable material and arranged along the scan path, the guide film to guide the document to the scanning glass,
wherein a tip end of the guide film is elastically supported by the scanning glass.

41. The image forming apparatus according to claim 36, wherein the second scan roller includes nip portions, and wherein the scan path downstream of the scanning glass and the white bar guides the document to the nip portions.

42. The image forming apparatus according to claim 36, further comprising:
a drive motor to generate rotating force so as to rotate the second scan roller,
wherein the drive roller is operated by the rotation of the second scan roller.

43. An image reading device, comprising:
a scanning glass;
a white bar disposed to form a path of a medium with the scanning glass, and comprising:
a first portion located in a downstream portion of the white bar to face the scanning glass to scan a medium at a scan point of the medium path,
a second portion located in an upstream portion of the white bar and extended from the first portion, and
a hole formed on the second portion; and
a drive roller installed to protrude from the second portion through the hole toward the path to feed the medium.

44. The image reading device of claim 43, further comprising:
a frame having the scanning glass, the white bar, and the drive roller,
wherein the frame includes a feed path including the medium path, an outlet extending from the medium path, a first path to connect the medium from the medium path to the feed path, and a second path to connect the medium from the medium path to the outlet path.

45. A method of scanning a document in an image scanning apparatus, the method comprising:
feeding a document at a predetermined speed to a scanning point on a scanning glass by rotating a driving roller disposed at a white bar arranged opposite the scanning glass; and
scanning the document as the document passes the scanning point.

46. A method of scanning a document in an image scanning apparatus, the method comprising:
feeding a document towards a scanning point on a scanning glass;
applying a delivery force to the document with a driving roller disposed at a white bar arranged opposite the scanning glass to feed the document at a predetermined speed to the scanning point; and
scanning the document as the document passes the scanning point.

47. A method of forming an image of an image forming apparatus, the method comprising:
feeding a document at a predetermined speed to a scanning point on a scanning glass by rotating a driving roller disposed at a white bar arranged opposite the scanning glass;
scanning image data of the document as the document passes the scanning point; and
printing the image data on a printing medium.

48. A method of forming an image of an image forming apparatus, comprising:
feeding a document towards a scanning point on a scanning glass;
applying a delivery force to the document with a driving roller disposed at a white bar arranged opposite the scanning glass to feed the document at a predetermined speed to the scanning point;
scanning image data of the document as the document passes the scanning point; and
printing the image data on a printing medium.

* * * * *